(12) United States Patent
Hashimoto et al.

(10) Patent No.: US 11,132,999 B2
(45) Date of Patent: Sep. 28, 2021

(54) INFORMATION PROCESSING DEVICE, INFORMATION PROCESSING METHOD, AND NON-TRANSITORY COMPUTER READABLE STORAGE MEDIUM

(71) Applicant: YAHOO JAPAN CORPORATION, Tokyo (JP)

(72) Inventors: Chikara Hashimoto, Tokyo (JP); Manabu Sassano, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 392 days.

(21) Appl. No.: 16/120,893

(22) Filed: Sep. 4, 2018

(65) Prior Publication Data
US 2019/0074004 A1    Mar. 7, 2019

(30) Foreign Application Priority Data

Sep. 7, 2017 (JP) .............................. JP2017-171926

(51) Int. Cl.
| | | |
|---|---|---|
| *G10L 15/22* | (2006.01) | |
| *G10L 15/06* | (2013.01) | |
| *H04L 12/58* | (2006.01) | |
| *G06F 40/30* | (2020.01) | |
| *G10L 25/78* | (2013.01) | |

(52) U.S. Cl.
CPC .............. *G10L 15/22* (2013.01); *G06F 40/30* (2020.01); *G10L 15/063* (2013.01); *H04L 51/02* (2013.01);

(Continued)

(58) Field of Classification Search
CPC ......... G06F 16/35; G10L 15/01; G10L 15/05; G10L 15/04; G10L 15/06; G10L 15/063;
(Continued)

(56) References Cited

U.S. PATENT DOCUMENTS 5,761,637 A *  6/1998  Chino ................. G10L 15/1807
                                                    704/231
7,194,069 B1 *  3/2007  Jones .................... H04M 3/493
                                                    379/210.01
(Continued)

FOREIGN PATENT DOCUMENTS

JP      2007-043356 A    2/2007

OTHER PUBLICATIONS

Meena, R., Skantze, G., & Gustafson, J. (2014). Data-driven models for timing feedback responses in a Map Task dialogue system. Computer Speech & Language, 28(4), 903-922 (Year: 2014).*

*Primary Examiner* — Edgar X Guerra-Erazo
(74) *Attorney, Agent, or Firm* — Oliff PLC

(57) ABSTRACT

An information processing device according to the present application includes an extraction unit and a subsequent stage generation unit. The extraction unit extracts a last conversation of a feedback utterance estimated to indicate a predetermined reaction of a second utterance subject relative to an utterance made by a first utterance subject, from a set of a plurality of conversations, based on a score assigned to the feedback utterance. The subsequent stage generation unit generates a subsequent stage classifier for deriving an index indicating a category of an unknown conversation, based on the last conversation extracted by the extraction unit.

14 Claims, 12 Drawing Sheets

(52) U.S. Cl.
CPC .. *G10L 2015/225* (2013.01); *G10L 2025/783* (2013.01); *H04L 51/16* (2013.01)

(58) Field of Classification Search
CPC ... G10L 15/08; G10L 15/22; G10L 2015/221; G10L 15/222; G10L 2015/223; G10L 2015/225; G10L 15/26; G10L 15/32; G10L 15/285; G10L 15/00; G10L 13/00; G10L 2025/783; G10L 2015/0636
USPC ........................................................ 704/243
See application file for complete search history.

(56) References Cited

U.S. PATENT DOCUMENTS

| | | | | |
|---|---|---|---|---|
| 7,562,128 | B1* | 7/2009 | Caris | H04L 12/282 709/220 |
| 9,685,152 | B2* | 6/2017 | Matsubara | G10L 13/027 |
| 2005/0096753 | A1* | 5/2005 | Arling | H04L 12/282 700/11 |
| 2006/0100879 | A1* | 5/2006 | Jakobsen | H04M 1/271 704/270 |
| 2007/0195711 | A1* | 8/2007 | Morris | H04L 41/082 370/254 |
| 2009/0026978 | A1* | 1/2009 | Robinson | H05B 47/175 315/294 |
| 2010/0222098 | A1* | 9/2010 | Garg | H04M 1/72436 455/556.1 |
| 2011/0242056 | A1* | 10/2011 | Lee | G06F 3/04166 345/175 |
| 2013/0131836 | A1* | 5/2013 | Katz | H04N 21/44218 700/12 |
| 2015/0141005 | A1* | 5/2015 | Suryavanshi | H04W 48/16 455/434 |
| 2019/0138190 | A1* | 5/2019 | Beaver | G06F 3/04842 |
| 2020/0117858 | A1* | 4/2020 | Freeman | G06F 40/117 |

* cited by examiner

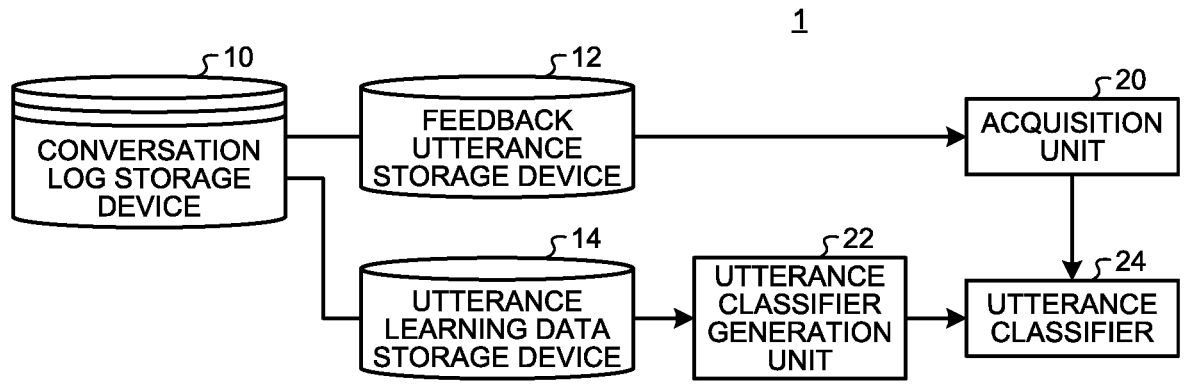

FIG.12
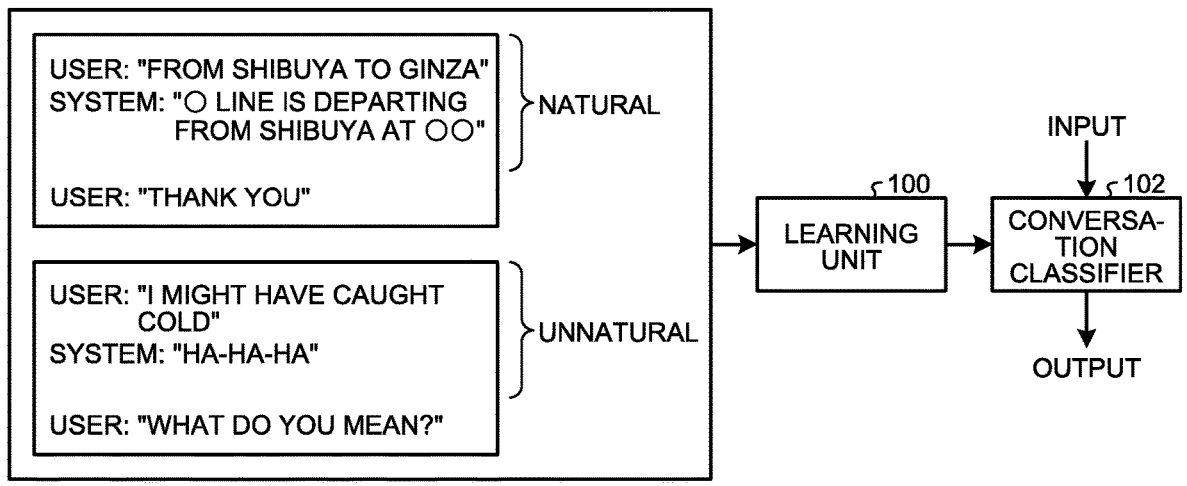
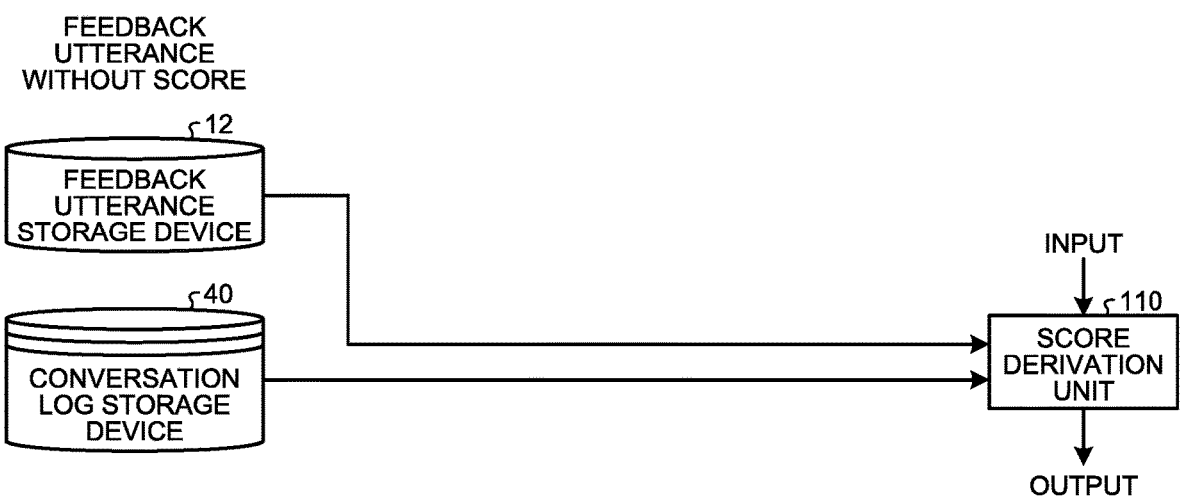

INFORMATION PROCESSING DEVICE, INFORMATION PROCESSING METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2017-171926 filed in Japan on Sep. 7, 2017.

BACKGROUND OF THE INVENTION

1. Field of the Invention

This disclosure relates to an information processing device, an information processing method, and a non-transitory computer readable storage medium.

2. Description of the Related Art

Conventionally, a device that registers in advance, words used when a user asks the person he or she is talking to to repeat or clarify what the person has just said in a conversation and the like, and that determines that the conversation is not effectively carried out when the registered word is included in the conversation, has been developed (see Japanese Laid-open Patent Publication No. 2007-43356).

However, the device described above sometimes cannot make a determination on words other than the words registered in advance, because the device depends on the words registered in advance to determine whether conversation is effectively carried out.

SUMMARY OF THE INVENTION

According to one innovative aspect of the subject matter described in this disclosure, an information processing device includes: (i) an extraction unit that extracts a last conversation of a feedback utterance estimated to indicate a predetermined reaction of a second utterance subject relative to an utterance made by a first utterance subject, from a set of a plurality of conversations, based on a score assigned to the feedback utterance; and (ii) a subsequent stage generation unit that generates a subsequent stage classifier for deriving an index indicating a category of an unknown conversation, based on the last conversation extracted by the extraction unit.

BRIEF DESCRIPTION OF THE DRAWINGS

FIG. 1 is a diagram illustrating a part of a configuration of an information processing system 1;

FIG. 2 is a diagram illustrating an example of the contents of a label to be applied to a feedback utterance;

FIG. 3 is a diagram illustrating examples of the contents of labels to be applied to the last conversation of the feedback utterance;

FIG. 12 is a diagram illustrating functional configurations of a first comparative example and a second comparative example;

DETAILED DESCRIPTION OF THE PREFERRED EMBODIMENTS

Figure 4:
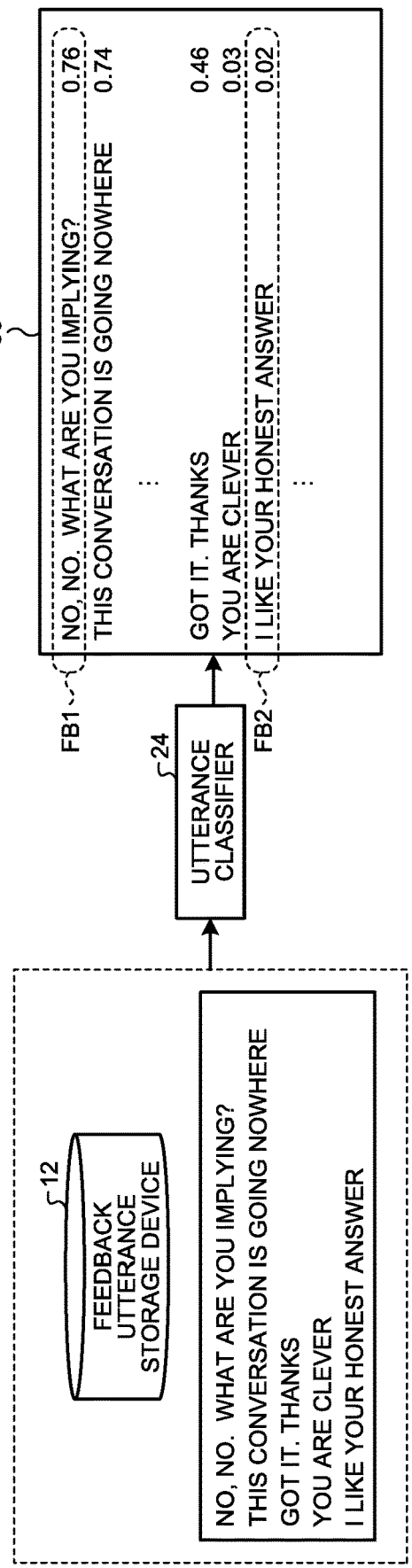
FIG. 4 is a diagram illustrating an example of feedback utterances input to an utterance classifier 24 and utterance scores output by the utterance classifier 24.

Hereinafter, an embodiment of an information processing device, an information processing method, and a non-transitory computer readable storage medium of the present invention will be described in detail with reference to the accompanying drawings. In the following explanation, a word issued by an automatic answering machine or a user is referred to as an "utterance", a set of a plurality of the utterances is referred to as "conversation", and an utterance estimated to indicate a predetermined reaction of a second utterance subject relative to an utterance made by a first utterance subject is referred to as a "feedback utterance". An example of the first utterance subject is the automatic answering machine, and an example of the second utterance subject is the user (person).

The information processing device is implemented by one or more processors. For example, the information processing device derives an index indicating a category of conversation, on the conversation between the user and the automatic answering machine. For example, the category of conversation is whether the conversation is unnatural (conversely, whether the conversation is natural). For example, when the conversation is unnatural, the conversation is not established because an appropriate response is not automatically being made. The category of conversation is not limited to whether the conversation is unnatural, and may be optionally defined.

Moreover, the information processing device generates an utterance classifier and a conversation classifier while performing the process. The utterance classifier derives an index (utterance score, which will be described below) that is applied to the feedback utterance and that indicates the probability of an unnatural conversation or a natural conversation being made immediately before the feedback utterance. In the embodiment to be described below, the utterance score is an index indicating the probability of an unnatural conversation being made immediately before the feedback utterance. Moreover, in the following, the "conversation made immediately before" (or "last conversation") is regarded as a combination of the utterance of the user and the utterance made by the automatic answering machine relative to the utterance of the user. The conversation classifier derives an index (conversation score, which will be described below) that is applied to a conversation and that indicates the probability of the conversation being unnatural.

Configuration

FIG. 1 is a diagram illustrating a part of a configuration of an information processing system 1. For example, the information processing system 1 includes a conversation log storage device 10, a feedback utterance storage device 12, an utterance learning data storage device 14, an acquisition unit 20, an utterance classifier generation unit (prior stage generation unit) 22, and an utterance classifier 24. The functional configurations described above can also be configured as devices.

For example, the acquisition unit 20, the utterance classifier generation unit 22, and the utterance classifier 24 are implemented when a hardware processor such as a central processing unit (CPU) executes a computer program (software). Moreover, a part or all of these components may be implemented by hardware (including circuitry) such as a large scale integration (LSI), an application specific integrated circuit (ASIC), a field-programmable gate array (FPGA), and a graphics processing unit (GPU), or may be implemented by cooperation of software and hardware.

For example, each of the storage devices included in the information processing system 1 is implemented by a read only memory (ROM), a hard disk drive (HDD), a flash memory, a secure digital (SD) card, a random access memory (RAM), a register, and the like.

The conversation log storage device 10 stores therein log information of a conversation. For example, the log information of a conversation is text information of a conversation made between an automatic answering machine operated by artificial intelligence (AI) and a user. The text information may be obtained by converting uttered voice through voice recognition.

The feedback utterance storage device 12 stores therein feedback utterances. The feedback utterances are extracted from the conversation log storage device 10 to be stored in the feedback utterance storage device 12. For example, each of the feedback utterances is a feedback utterance set in advance. For example, a feedback utterance is extracted (acquired) when an operator extracts the feedback utterance from log information of a conversation stored in the conversation log storage device 10, or when a predetermined device (or another system) automatically extracts the feedback utterance from log information of a conversation stored in the conversation log storage device 10, on the basis of the words in the feedback utterance set in advance.

As described above, the feedback utterance storage device 12 stores therein the feedback utterance acquired from the conversation log storage device 10. FIG. 2 is a diagram illustrating examples of the feedback utterance. For example, the feedback utterance includes an utterance such as (1) "No, no. What are you implying?" and (2) "Got it. Thanks". It is not possible to accurately determine whether the last conversation of the feedback utterance is established, if the feedback utterance is only denying the last conversation or accepting the last conversation. Consequently, the information processing system 1 of the present embodiment generates the utterance classifier 24 capable of outputting a score (probability) indicating whether the last conversation is established or the like, only by the feedback utterance.

First, a conversation with a feedback utterance is acquired from the conversation log storage device 10, and as illustrated in FIG. 3, a natural label (label indicating a first category) or an unnatural label (label indicating a second category) is applied to the last conversation of the feedback utterance. Learning data in which the label applied to the last conversation of the feedback utterance is set as a teacher label of the feedback utterance is generated, and is stored in the utterance learning data storage device 14.

In the example of FIG. 3, learning data in which a teacher label of being natural is applied to the feedback utterance of "Thank you" because the last conversation of "Thank you" is natural, and a teacher label of being unnatural is applied to the feedback utterance of "What do you mean?" because the last conversation of "What do you mean?" is unnatural, is generated.

The utterance classifier generation unit 22 generates the utterance classifier 24 by learning the learning data described above. The utterance classifier generation unit 22 also performs learning by using a method such as a deep learning technique using the neural network and the like, and a support vector machine (SVM).

Upon receiving a known or unknown feedback utterance, the utterance classifier 24 derives an utterance score indicating the probability of the conversation made immediately before the feedback utterance being unnatural. For example, the feedback utterance received by the utterance classifier 24 is the feedback utterance acquired by the acquisition unit 20 from the feedback utterance storage device 12. The utterance score is an index indicating the probability of the utterance made by the automatic answering machine immediately before the feedback utterance being unnatural, relative to the utterance made by a person immediately before the utterance. In other words, with an increase in the utterance score, the probability of the last conversation of the feedback utterance between the user and the automatic answering machine being unnatural increases.

FIG. 4 is a diagram illustrating an example of feedback utterances input to the utterance classifier 24 and utterance scores output by the utterance classifier 24. For example, the utterance score derived for the utterance "No, no. What are you implying? (FB1 in the diagram)" is higher than the utterance score derived for the utterance "I like your honest answer (FB2 in the diagram)".

By using the score derived by the utterance classifier 24, it is possible to determine whether the conversation is natural or unnatural, only by the feedback utterance and without closely examining the contents of the conversation. Moreover, in the present embodiment, a binary label of a natural label indicating that the last conversation is natural, or an unnatural label indicating that the last conversation is unnatural is applied to the feedback utterance. The label indicating the first category or the label indicating the second category can be applied to any feedback utterance, regardless of whether the last conversation is established (or natural) or unestablished (or unnatural). For example, the label indicating the first category may be applied to a feedback utterance indicating praise, acceptance, understanding, thankfulness, interest, or the like, and the label indicating the second category may be applied to a feedback utterance indicating disappointment, communication failure, incomprehension, despise, boredom, or the like.

The utterance classifier 24 stores correspondence information obtained by associating the feedback utterance with the utterance score, in a scored feedback utterance storage device 50, which will be described below, of the information processing system 1.

Figure 5:
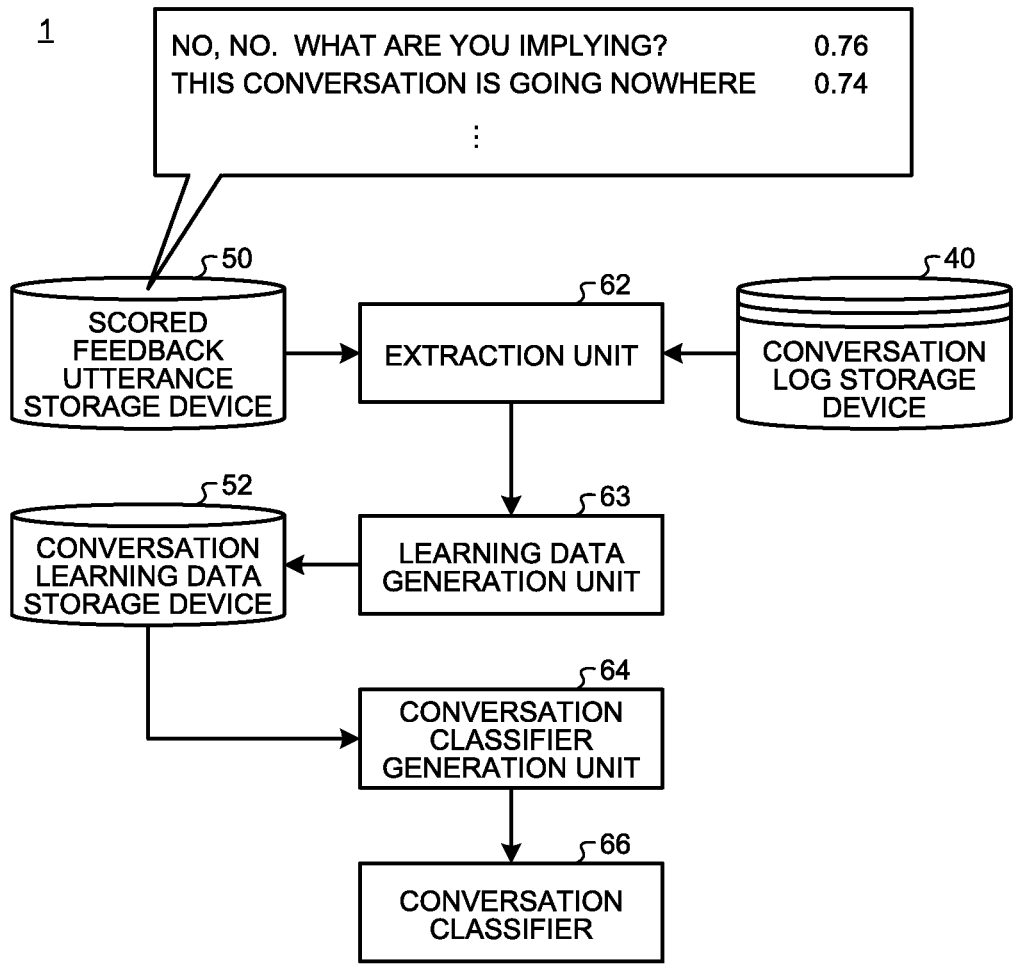
FIG. 5 is a diagram illustrating another configuration of the information processing system 1.

FIG. 5 is a diagram illustrating another configuration of the information processing system 1. In addition to the configuration illustrated in FIG. 1, the information processing system 1 further includes a conversation log storage device 40, the scored feedback utterance storage device 50, a conversation learning data storage device 52, an extraction unit 62, a learning data generation unit 63, a conversation classifier generation unit (subsequent stage generation unit) 64, and a conversation classifier 66. These functional configurations can also be configured as devices. Any of the functional configurations included in the information processing system 1 may also be configured as a device.

For example, a part or all of the extraction unit 62, the learning data generation unit 63, the conversation classifier generation unit 64, and the conversation classifier 66 can be implemented when a hardware processor such as the CPU executes a computer program (software). A part or all of these components may also be implemented by hardware (including circuitry) such as the LSI, the ASIC, the FPGA, and the GPU, or may be implemented by cooperation of software and hardware.

For example, the components illustrated in FIG. 1 and FIG. 5 communicate through inter-software communication or a hardware network. For example, the hardware network may include a wide area network (WAN), a local area network (LAN), the Internet, a dedicated circuit, a radio base station, a provider, and the like.

For example, the conversation log storage device 40 stores therein log information of a conversation. The log information of the conversation may be the same as or different from the information stored in the conversation log storage device 10.

The scored feedback utterance storage device 50 stores therein feedback utterances with utterance scores derived by the utterance classifier 24, and the utterance scores of the feedback utterances.

The extraction unit 62 acquires a feedback utterance and a score corresponding to the feedback utterance from the scored feedback utterance storage device 50, and acquires a conversation with the feedback utterance (feedback utterance and the last conversation) from the conversation log storage device 40. When the conversation with the feedback utterance is acquired from the conversation log storage device 40, the feedback utterance extracted from the scored feedback utterance storage device 50 will be used.

The extraction unit 62 acquires a conversation with the feedback utterance extracted from the conversation log storage device 40, and assigns a score to the last conversation of the feedback utterance on the basis of the score assigned to the feedback utterance extracted from the scored feedback utterance storage device 50.

To assign a score to a conversation with a feedback utterance not stored in the scored feedback utterance storage device 50, a score is acquired by supplying the feedback utterance of the conversation to the utterance classifier 24.

The learning data generation unit 63 generates learning data in which the last conversation of the feedback utterance and the category are set as a teacher label, by applying a label indicating the category to the last conversation of the feedback utterance, on the basis of the score assigned to the last conversation of the feedback utterance. The learning data generation unit 63 then stores the learning data in the conversation learning data storage device 52.

For example, a first category label is applied to the last conversation of the feedback utterance to which a score equal to or less than a first threshold (for example, 0.3) is assigned, and a second category label is applied to the last conversation of the feedback utterance to which a score equal to or more than a second threshold (for example, 0.7) is assigned. Instead of using the threshold of the score as described above, the feedback utterances may be sorted in the descending order of the scores, and the second category label may be applied to the last conversation of the feedback utterance in a certain high ratio (for example, 20%), and the first category label may be applied to the last conversation of the feedback utterance not in the certain high ratio.

Figure 6:
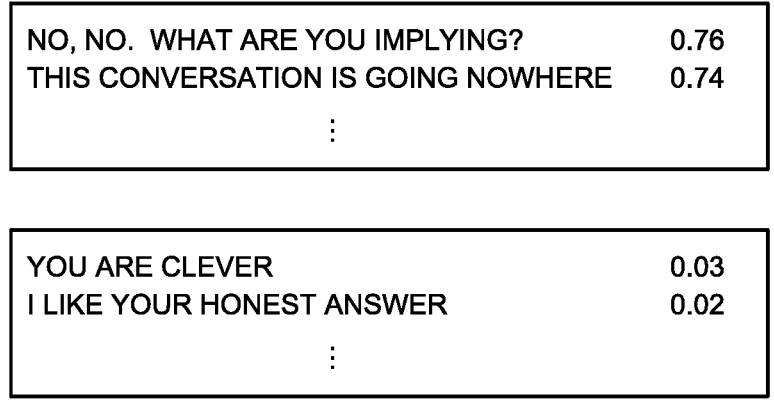
FIG. 6 is a diagram illustrating an example of feedback utterances biased to the first category side or the second category side.

FIG. 6 is a diagram illustrating an example of feedback utterances each assigned with a score. For example, when the first category label is applied to the feedback utterance assigned with a score equal to or less than 0.3, and the second category label is applied to the feedback utterance assigned with a score equal to or more than 0.7, an example of the feedback utterance with the utterance score biased to the first category side is "You are clever", and "I like your honest answer", and an example of the feedback utterance with the utterance score biased to the second category side is "No, no. What are you implying?" and "This conversation is going nowhere".

Figure 7:
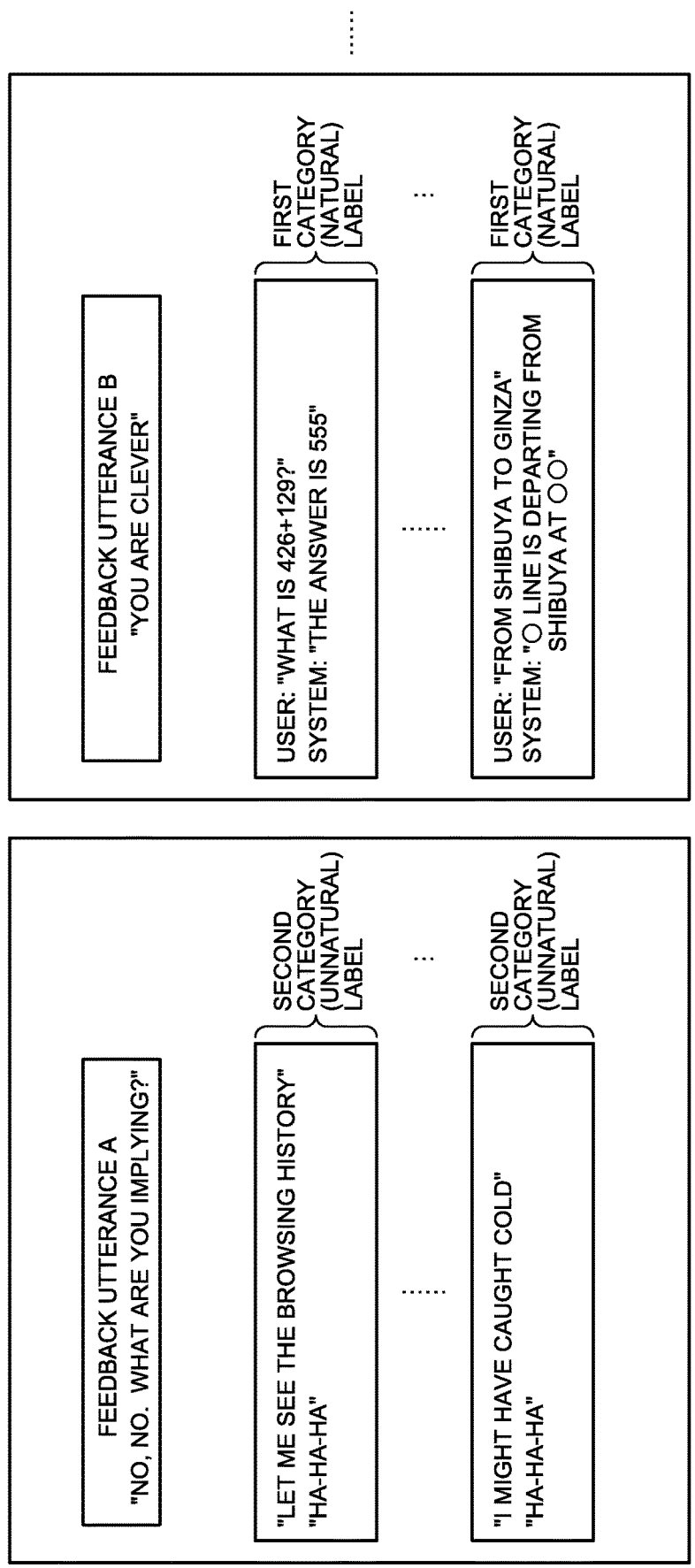
FIG. 7 is a diagram illustrating examples of conversations stored in a conversation learning data storage device 52.

FIG. 7 is a diagram illustrating examples of conversations extracted from the conversation log storage device 40. A label is applied to the last conversation of the feedback utterance "No, no. What are you implying?", on the basis of the score of the feedback utterance "No, no. What are you implying?". A label is applied to the last conversation of the feedback utterance "You are clever", on the basis of the score of the feedback utterance "You are clever". For example, when the first category label is applied to the last conversation of the feedback utterance to which the score equal to or less than 0.3 is assigned, and the second category label is applied to the last conversation of the feedback utterance to which the score equal to or more than 0.7 is assigned, learning data in which the first category label is applied to the conversation of "What is 426+129?" and "The answer is 555", and the second category label is applied to the conversation of "Let me see the browsing history" and "Ha-ha-ha", is generated.

The conversation learning data storage device 52 stores therein learning data in which the label indicating the category described above (for example, the first category or the second category) is applied to the last conversation of the feedback utterance (not including the feedback utterance) generated by the learning data generation unit 63.

The conversation classifier generation unit 64 generates the conversation classifier 66 for deriving a conversation score that is an index indicating the category of an unknown conversation, on the basis of the last conversation of the feedback utterance extracted by the extraction unit 62. The conversation classifier generation unit 64 performs learning on the basis of the last conversation of the feedback utterance biased to the first category side, the last conversation of the feedback utterance biased to the second category side, and information on the label (first category or second category) applied to each of the last conversations. For example, the learning is carried out by machine learning. The conversation classifier generation unit 64 generates the conversation classifier 66 on the basis of the machine learning in which the last conversation extracted by the extraction unit 62 and information on the label applied to the last conversation are set as a teacher label. The conversation classifier generation unit 64 may also learn the above by using methods such as a deep learning technique using the neural network and the SVM.

Figure 8:
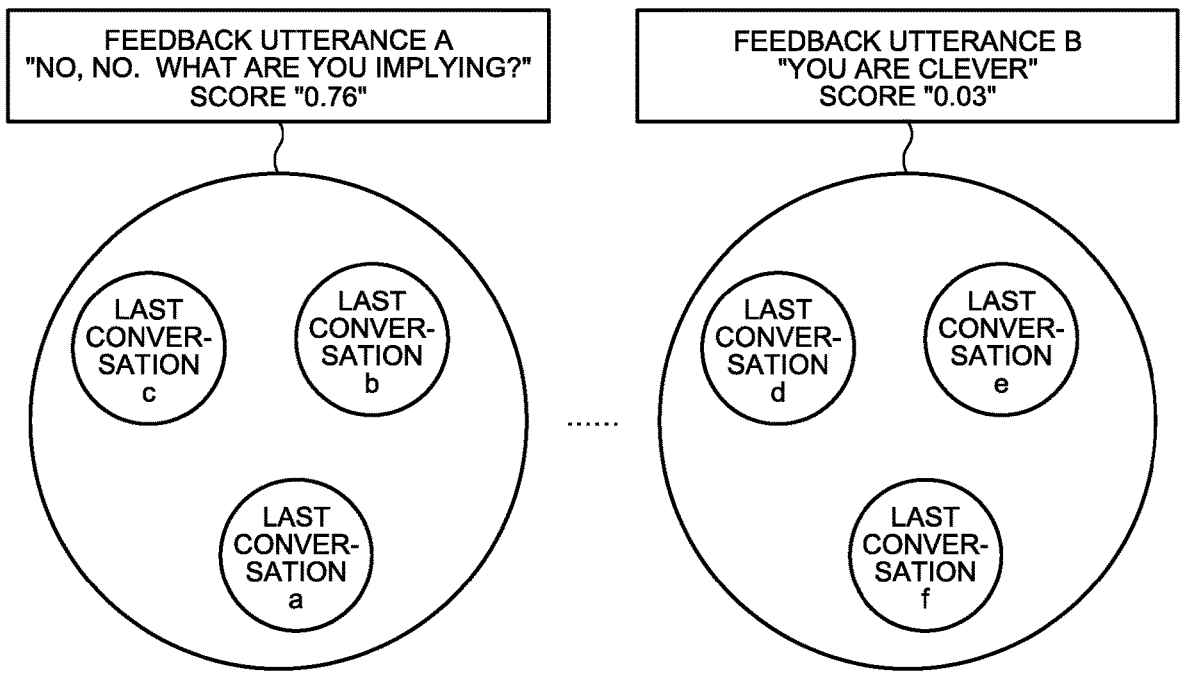
FIG. 8 is a diagram schematically illustrating a learning process.

FIG. 8 is a diagram schematically illustrating a learning process. For example, when the feedback utterance biased to the second category side is "No, no. What are you implying?", conversations a to c made immediately before "No, no. What are you implying?" will be extracted. Moreover, when the feedback utterance biased to the first category side is "You are clever", conversations d to f made immediately before "You are clever" will be extracted. In this manner, the conversation classifier 66 is learned from the conversation having a high probability of being a natural or unnatural conversation, in the conversations between the user and the automatic answering machine.

Upon receiving an unknown or known conversation, the conversation classifier 66 derives a conversation score (subsequent stage index) indicating the category of the conversation. The conversation score is an index indicating the probability of the utterance made by the automatic answering device being unnatural, relative to an utterance made by a person immediately before the utterance. In other words, with an increase in the utterance score, the probability of the conversation made between the user and the automatic answering machine being unnatural increases.

Figure 9:
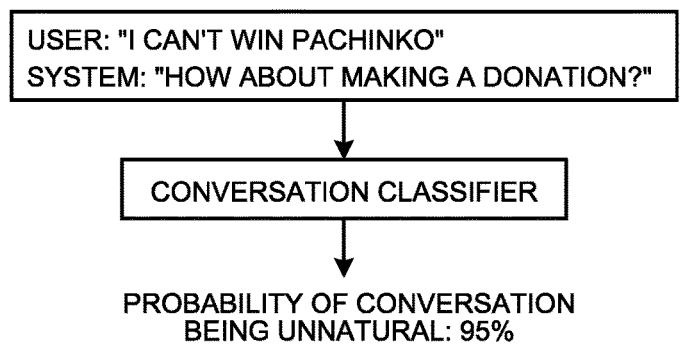
FIG. 9 is a diagram illustrating an example of a conversation input to a conversation classifier 66 and information output from the conversation classifier 66.

FIG. 9 is a diagram illustrating an example of an (unknown) conversation input to the conversation classifier 66 and information output by the conversation classifier 66. For example, when the utterance of the user "I can't win pachinko" and the utterance of the automatic answering machine "How about making a donation?" that is the response to the utterance of the user are input to the conversation classifier 66, the conversation classifier 66 outputs that the probability of the conversation described above being unnatural is 95 percent. In this manner, the conversation classifier 66 can also determine the naturalness or unnaturalness of an unknown conversation that is not followed by the feedback utterance.

Moreover, in the process described above, it is assumed that the probability of a conversation A of "Let me see the browsing history" and "Ha-ha-ha" has been learned to be highly unnatural. For example, when an unknown conversation of "Let me see the history" and "Ha-ha-ha" is input to the conversation classifier 66, the conversation classifier 66 derives a conversation score having a high probability of being unnatural for the unknown conversation, as for the conversation A. This is because the words "browsing history" and "history" are close in meaning.

Process for Generating Utterance Classifier

Figure 10:
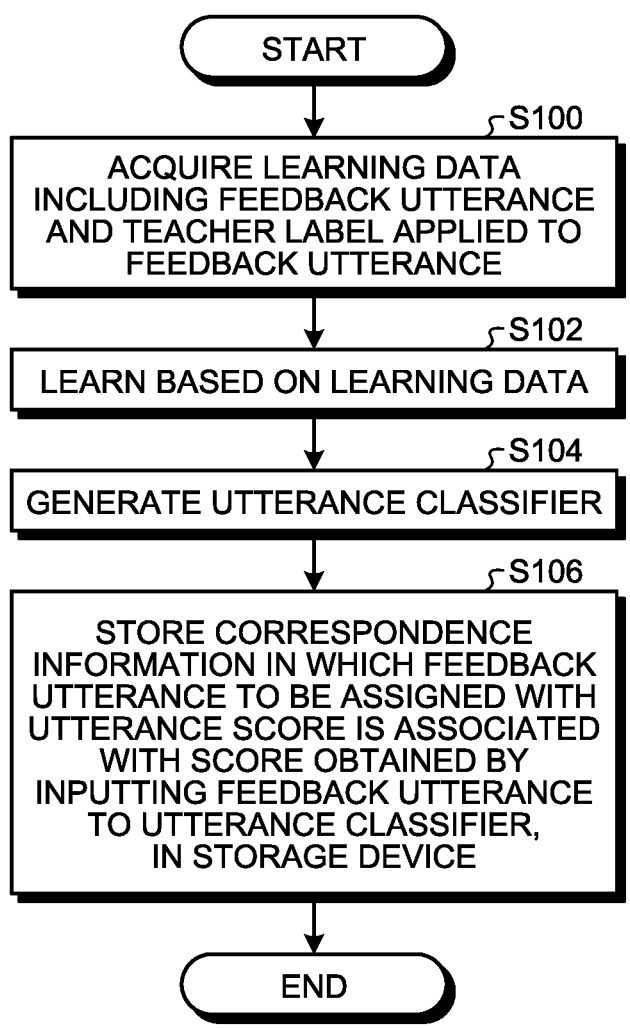
FIG. 10 is a flowchart illustrating a processing flow for generating the utterance classifier 24 by the information processing system 1.

FIG. 10 is a flowchart illustrating a processing flow for generating the utterance classifier 24 by the information processing system 1. First, the utterance classifier generation unit 22 acquires learning data including a feedback utterance and a teacher label applied to the feedback utterance, from the utterance learning data storage device 14 (S100).

Next, the utterance classifier generation unit 22 learns the probability of an unnatural conversation or a natural conversation being made immediately before the feedback utterance, on the basis of the learning data acquired at S100 (S102). Next, the utterance classifier generation unit 22 generates the utterance classifier 24 on the basis of the learning result at S102 (S104).

Next, the acquisition unit 20 acquires the feedback utterance to assign an utterance score, and inputs the acquired feedback utterance to the utterance classifier 24. The utterance classifier 24 assigns an utterance score to the input feedback utterance, and stores correspondence information in which the utterance score of the feedback utterance and the feedback utterance are associated with each other, in the scored feedback utterance storage device 50 of the information processing system 1 (S106). In this manner, the process of the present flowchart is terminated.

With the process described above, the utterance classifier 24 that derives an utterance score indicating the probability of the last conversation being unnatural relative to the feedback utterance is generated, and a score is assigned to a predetermined feedback utterance by the generated utterance classifier 24.

Process for Generating Conversation Classifier

Figure 11:
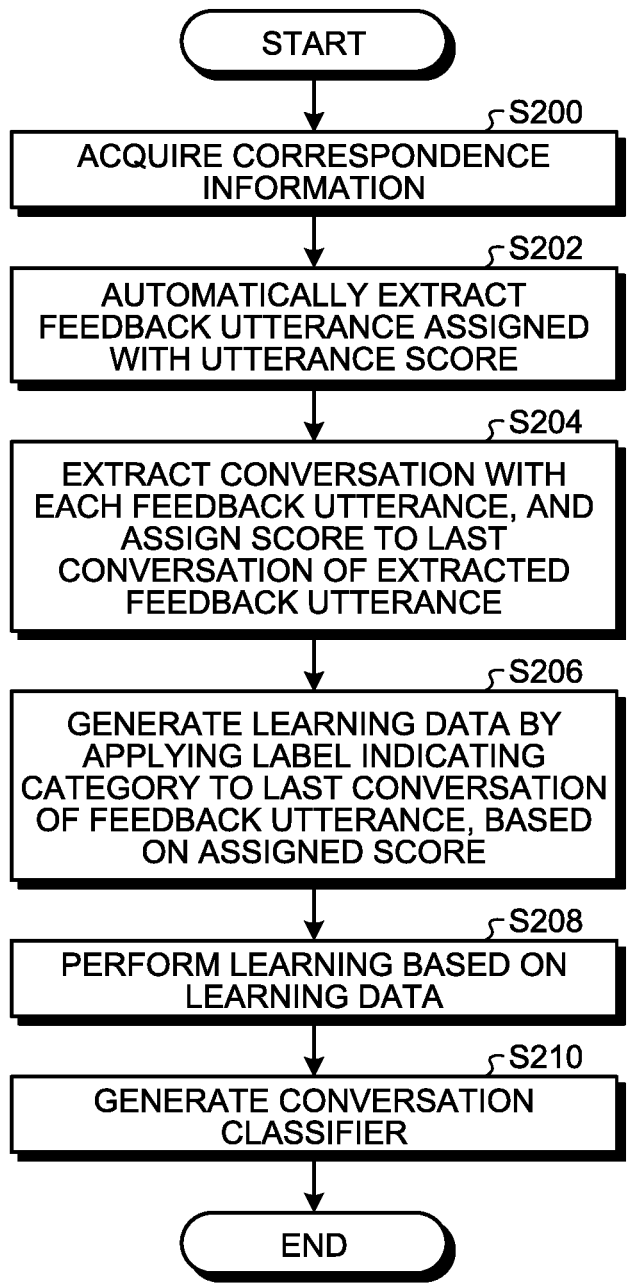
FIG. 11 is a flowchart illustrating a processing flow for generating the conversation classifier 66 by the information processing system 1.

FIG. 11 is a flowchart illustrating a processing flow for generating the conversation classifier 66 by the information processing system 1. First, the extraction unit 62 acquires correspondence information stored in the scored feedback utterance storage device 50 (S200). Next, the extraction unit 62 automatically extracts the feedback utterance assigned with the utterance score, from the correspondence information acquired at S200 (S202).

Next, the extraction unit 62 extracts a conversation with each feedback utterance (feedback utterance and the last conversation of the feedback utterance) extracted at S202, from the log information stored in the conversation log storage device 40. The extraction unit 62 then assigns a score to the last conversation of the extracted feedback utterance on the basis of the score assigned to the feedback utterance extracted from the scored feedback utterance storage device 50 (S204). Next, the learning data generation unit 63 generates learning data including information in which the last conversation of the feedback utterance and the category are a teacher label, by applying a label indicating the category to the last conversation of the feedback utterance on the basis of the score assigned at step S204. The learning data generation unit 63 then stores the learning data in the conversation learning data storage device 52 (S206).

Next, the conversation classifier generation unit 64 performs learning on the basis of the learning data that is generated at S206 and that is stored in the conversation learning data storage device 52 (S208). The conversation classifier generation unit 64 then generates the conversation classifier 66 on the basis of the learning result at S208 (S210). In this manner, the process of the present flowchart is terminated.

With the process described above, the conversation classifier 66 that derives the conversation score for indicating the unnaturalness of the conversation will be generated.

In the example illustrated above, the process of generating the utterance classifier 24 and the process of generating the conversation classifier 66 are different processes. However, these processes may be handled as a series of processes.

Conclusion

The last conversation of the feedback utterance indicating the first category may be unnatural, and the last conversation of the feedback utterance indicating the second category may be natural. Whether the conversation between the automatic answering device and the user is natural or unnatural is not always indicated by the category of the feedback utterance and may involve other factors. For example, when the automatic answering machine utters a kind word to the user, the user may make a feedback utterance indicating the first category. Alternatively, for example, when the automatic answering machine utters a word to make the user angry, the user may make a feedback utterance indicating the second category. Consequently, it is not appropriate to simply determine that the last conversation of the feedback utterance indicating the first category is natural, and the last conversation of the feedback utterance indicating the second category is unnatural.

Moreover, in the conversation, the feedback utterance indicating the first category or the second category is not frequently made. Consequently, when a machine learning technique is not applied to the conversation applied with a label, it has been difficult to determine the naturalness or unnaturalness of the conversation not followed by the feedback utterance in a wide range.

On the contrary, the information processing system 1 of the present embodiment generates the conversation classifier 66 by performing machine learning on the last conversation of the scored feedback utterance that is extracted from the log information of the conversation. Thus, compared with the method of simply identifying the last conversation of the feedback utterance indicating the first category as a natural conversation and the last conversation of the feedback utterance indicating the second category as an unnatural conversation, it is possible to determine the naturalness or unnaturalness of the conversation in a wide range. Consequently, this conversation classifier 66 can improve the coverage of the conversation to be determined, and also determine the naturalness or unnaturalness of the conversation for an unknown conversation.

Moreover, the information processing system 1 of the present embodiment generates the conversation classifier 66 by performing machine learning on the last conversation of the feedback utterance having the utterance score biased to the first category side or the second category side. Consequently, the conversation classifier 66 can more accurately determine whether the conversation is natural or unnatural.

Furthermore, the information processing system 1 of the present embodiment can easily generate the conversation classifier 66 suitable for a task or domain. For example, to generate the conversation classifier 66 suitable for a task or domain in a system of a comparative example, log information on the conversation made in the task or domain is collected, and a label is applied to the collected conversations. The system of the comparative example then generates the conversation classifier 66 by performing machine learning on the conversation applied with the label. In this case, the conversation classifier 66 needs to be created manually for each task or domain each time, thereby increasing the cost.

On the other hand, in the information processing system 1 of the present embodiment, when the utterance classifier 24 is generated on the basis of the log information of a certain conversation, the utterance classifier 24 can be applied to various tasks or domains. Thus, it is possible to easily generate the conversation classifier 66. For example, in the information processing system 1, the conversation classifier 66 is generated by extracting the last conversation of the feedback utterance assigned with the utterance score from the log information of the conversation made in the target task or domain, and by performing machine learning on the extracted conversation and the utterance score. Consequently, it is possible to generate the conversation classifier 66 suitable for the target task or domain. In this manner, the information processing system 1 can generate the conversation classifier 66 by applying the utterance classifier 24, even if a label is not applied to the conversation made in the target task or domain. In other words, with the method of the present embodiment, when a database of scored feedback utterances is once created, it is possible to automatically learn the conversation classifier 66 from the dialogue log of the task or domain and the scored feedback utterance storage device 50 without trouble, in other words, at a low cost, even if a new task or domain is to be tackled.

In the embodiment described above, the conversation classifier 66 derives the index indicating the unnaturalness of the conversation. However, the "unnaturalness" may be replaced with another feature. For example, an index indicating the probability of the last conversation of the feedback utterance being a predetermined category may be derived. For example, an index indicating the probability of the last conversation of the feedback utterance being beneficial to the user, an index indicating the probability of the last conversation of the feedback utterance being a conversation to improve the feeling of the user, and the like may be derived. In such a case, a label corresponding to the type of index is applied to the feedback utterance, instead of the label indicating the first category or the label indicating the second category. Moreover, a label corresponding to the type of index is applied to the last conversation of the feedback utterance, instead of the natural label or the unnatural label.

In the embodiment described above, the conversation classifier 66 derives the probability of a conversation belonging to one of the two categories (for example, the second category). Alternatively, the conversation classifier 66 can derive the probability of a conversation belonging to one of three or more categories. In this case, for example, labels indicating the categories of three or more types of conversations will be prepared. For example, it is assumed that a label indicating a third category of a neutral conversation is prepared in addition to the labels indicating the first category and the second category. In this case, the label indicating one of the first category to the third category is assigned to the last conversation of the feedback utterance stored in the utterance learning data storage device 14. The information processing system 1 then learns a relation between one of the first category to third category and the feedback utterance. Moreover, for example, the information processing system 1 automatically extracts the feedback utterance having a score included in a range indicating a natural conversation, an unnatural conversation, and a neutral conversation to which the utterance score is set in advance, from the correspondence information. The information processing system 1 then generates the conversation classifier 66, by learning a relation between the last conversation of the extracted feedback utterance and the label indicating the category of the conversation.

First and Second Comparative Examples

FIG. 12 is a diagram illustrating functional configurations of a first comparative example and a second comparative example. The first comparative example illustrated in the upper diagram in FIG. 12 is a method based on supervised learning using manually created data. In the first comparative example, a learning unit 100 machine learns the information stored in the utterance learning data storage device 14, and a conversation classifier 102 is generated from the learned result. The information stored in the utterance learning data storage device 14 is the last conversation of the feedback utterance applied with a natural label or an unnatural label.

In the second comparative example illustrated in the lower diagram in FIG. 12, a score is assigned to the conversation depending on which of the feedback utterance indicating the first category and the feedback utterance indicating the second category follows more. In the second comparative example, the utterance classifier 24 and the conversation classifier 66 are not used.

In the second comparative example, a score derivation unit 110 derives a score for the conversation, on the basis of the information (feedback utterance not assigned with a score) stored in the feedback utterance storage device 12 and the log information stored in the conversation log storage device 40. For example, Score is derived by the following formula (1). NEG is the number of feedback utterances indicating the second category that follows the target conversation of the log information. POS is the number of feedback utterances indicating the first category that follows the target conversation of the log information.

$$\text{Score}=\text{NEG}-\text{POS} \quad (1)$$

Comparison Between First Comparative Example and Second Comparison Example

Figure 13:
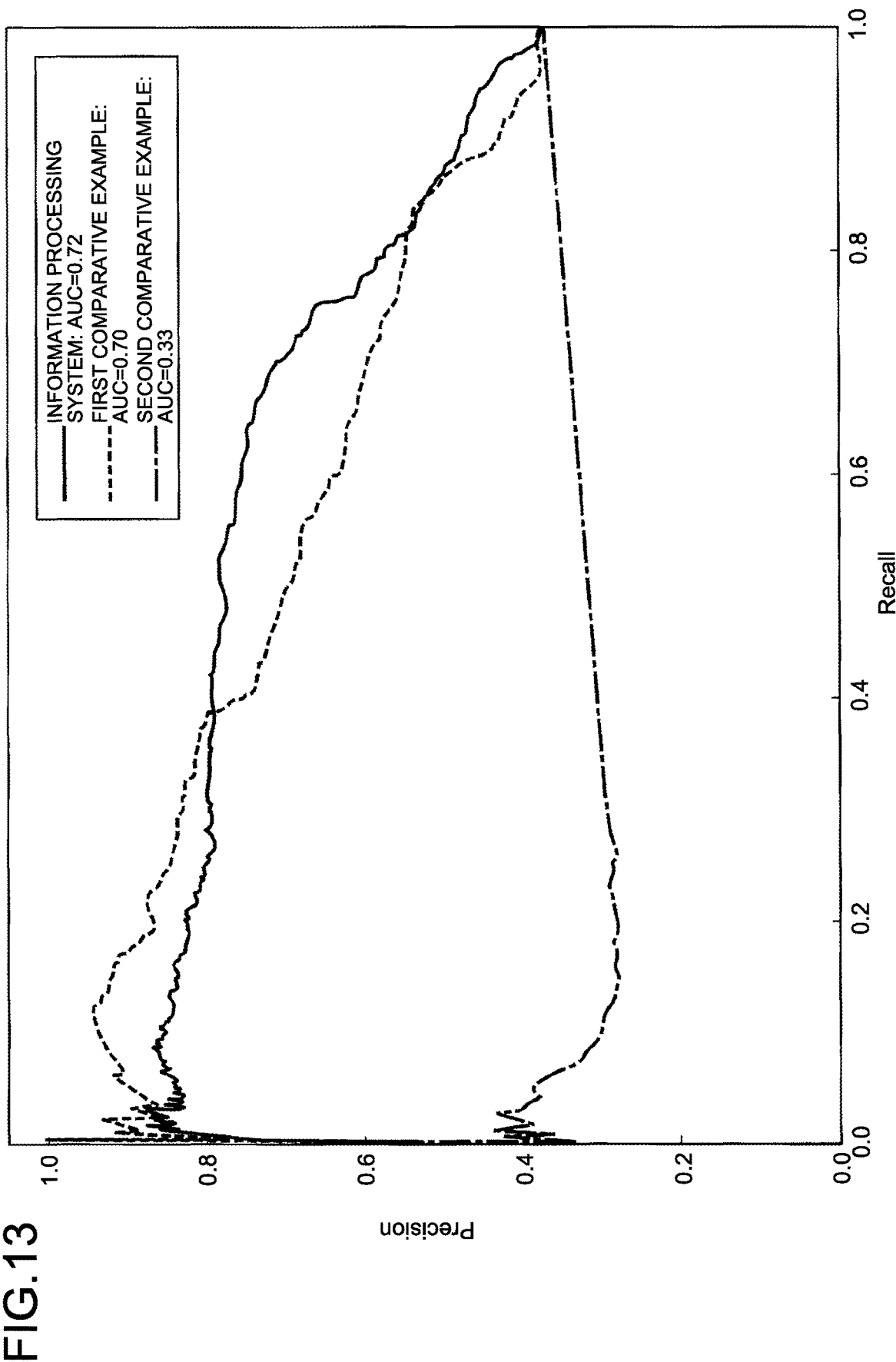
FIG. 13 is a diagram illustrating an example of processing results of the information processing system 1, the first comparative example, and the second comparative example.

FIG. 13 is a diagram illustrating an example of processing results of the information processing system 1, the first comparative example, and the second comparative example. The vertical axis of the diagram indicates the matching rate, and the horizontal axis indicates the reproduction rate. The matching rate is an index indicating the probability of a correct answer (unnatural conversation) being included in the result determined as an unnatural conversation by the information processing system 1. In this case, the information processing system 1 determines that the conversation is unnatural when the conversation score is equal to or more than a threshold. A correct (unnatural conversation) label is applied by a person. The reproduction rate is an index indicating the probability of the correct answer being determined as an unnatural conversation by the information processing system 1. An area under the curve (AUC) is an area of a portion below the curve in the graph.

As illustrated in the diagram, the performance of the information processing system 1 of the present embodiment is equivalent to that of the first comparative example, or equal to or higher than that of the first comparative example. More specifically, the method of the comparative example is an expensive method because the learning data of the conversation classifier needs to be manually created for each task or domain. However, the performance of the method of the present embodiment is equivalent to that of the first comparative example, even though the method is inexpensive and does not depend on the task or domain. Moreover, compared with the second comparative example in which the feedback utterance is vague and the feedback utterance is not frequently made, the information processing system 1 of the present embodiment has a significant performance.

Hereinafter, an information processing system 1A of a first modification, an information processing system 1B of a second modification, and an information processing system 1C of a third modification that are modifications of the information processing system 1 will be described.

First Modification

Figure 14:
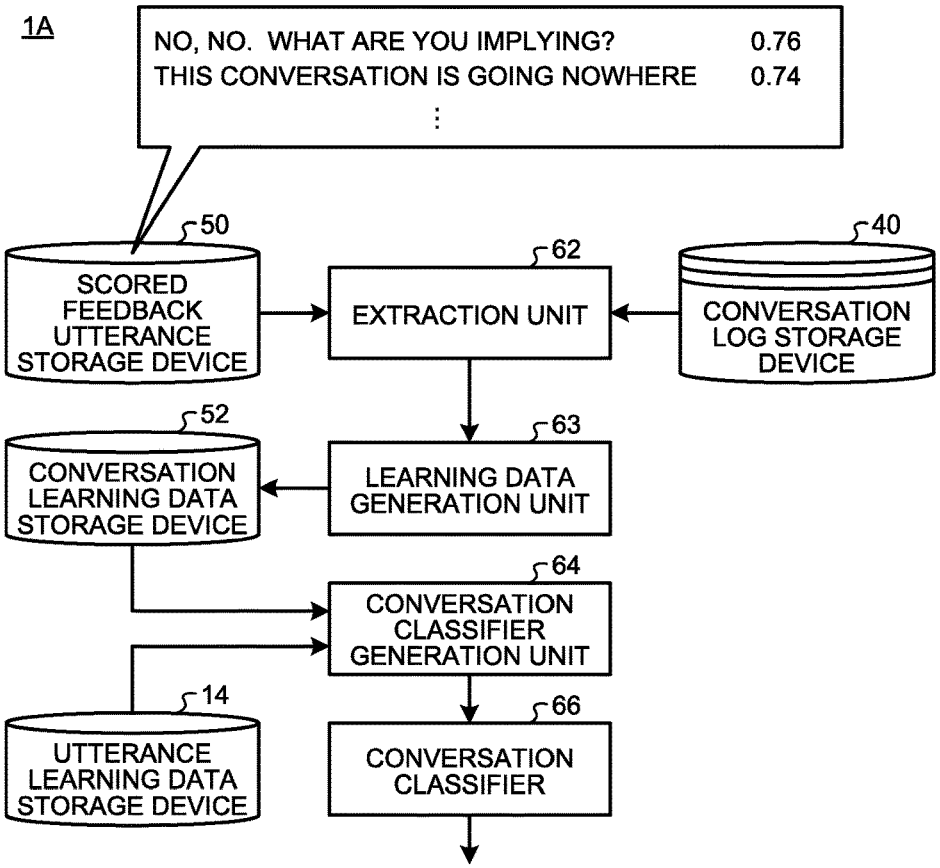
FIG. 14 is a diagram illustrating an example of a functional configuration of an information processing system 1A of a first modification.

The first modification is an example in which the conversation classifier generation unit 64 further learns the conversation between the automatic answering machine and the user that is stored in the utterance learning data storage device 14 and that is applied with a natural label or an unnatural label. FIG. 14 is a diagram illustrating an example of a functional configuration of the information processing system 1A of the first modification.

Second Modification

Figure 15:
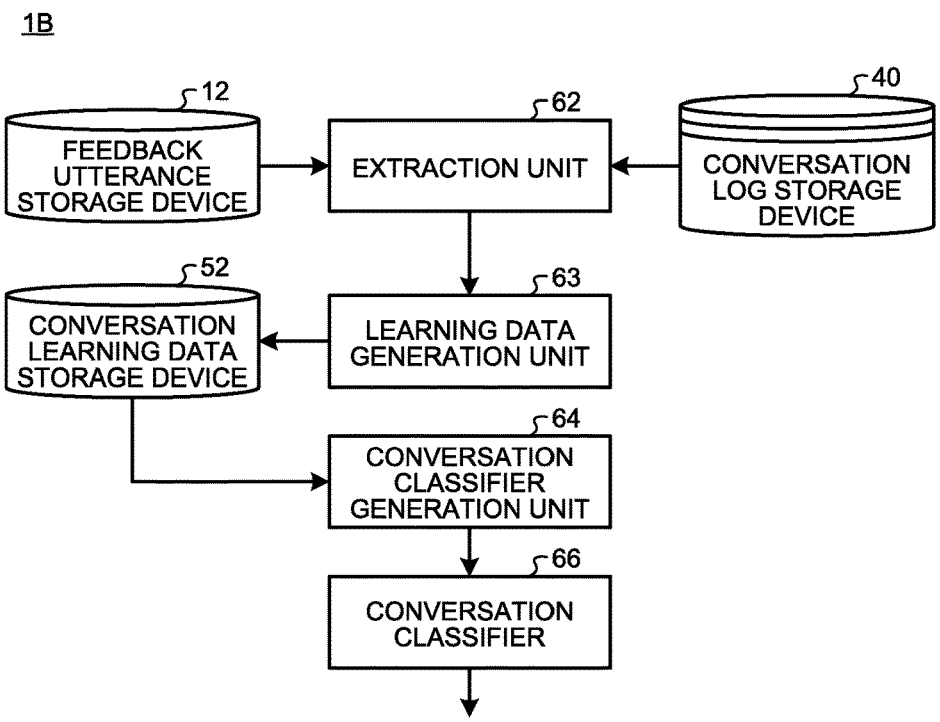
FIG. 15 is a diagram illustrating an example of a functional configuration of an information processing system 1B of a second modification.

The second modification is an example in which the utterance classifier 24 is omitted. In this case, the information processing system 1B includes the feedback utterance storage device 12 instead of the scored feedback utterance storage device 50. FIG. 15 is a diagram illustrating an example of a functional configuration of the information processing system 1B of the second modification. The conversation classifier generation unit 64 of the information processing system 1B derives a conversation candidate having a high probability of being a natural conversation and a conversation candidate having a high probability of being an unnatural conversation using the formula (1) described above.

For example, the information processing system 1B sets a conversation in which the score is within a predetermined range as the conversation candidate having a high probability of being a natural conversation, and a conversation in which the score is within a range different from the predetermined range as the conversation candidate having a high probability of being an unnatural conversation.

Third Modification

Figure 16:
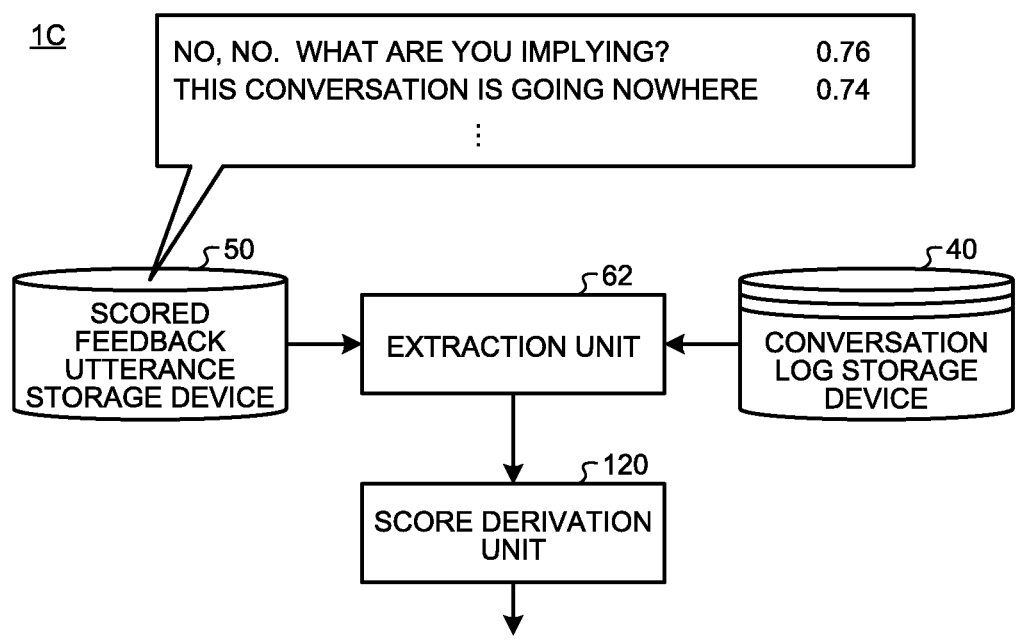
FIG. 16 is a diagram illustrating an example of a functional configuration of an information processing system 1C of a third modification.

FIG. 16 is a diagram illustrating an example of a functional configuration of the information processing system 1C of the third modification. In the third modification, the learning data generation unit 63 and the conversation learning data storage device 52 are omitted, and a score derivation unit 120 is included instead of the conversation classifier 66 of the information processing system 1. Among the feedback utterances stored in the scored feedback utterance storage device 50, the extraction unit 62 extracts the feedback utterance with a score within a first range (for example, within 20% or 30% from the minimum value) and a score within a second range (for example, within 20% or 30% from the maximum value). The score derivation unit 120 derives a score by using the feedback utterance extracted by the extraction unit 62. More specifically, the score derivation unit 120 derives a score by using the formula (1) described above.

Comparison with Modifications

Figure 17:
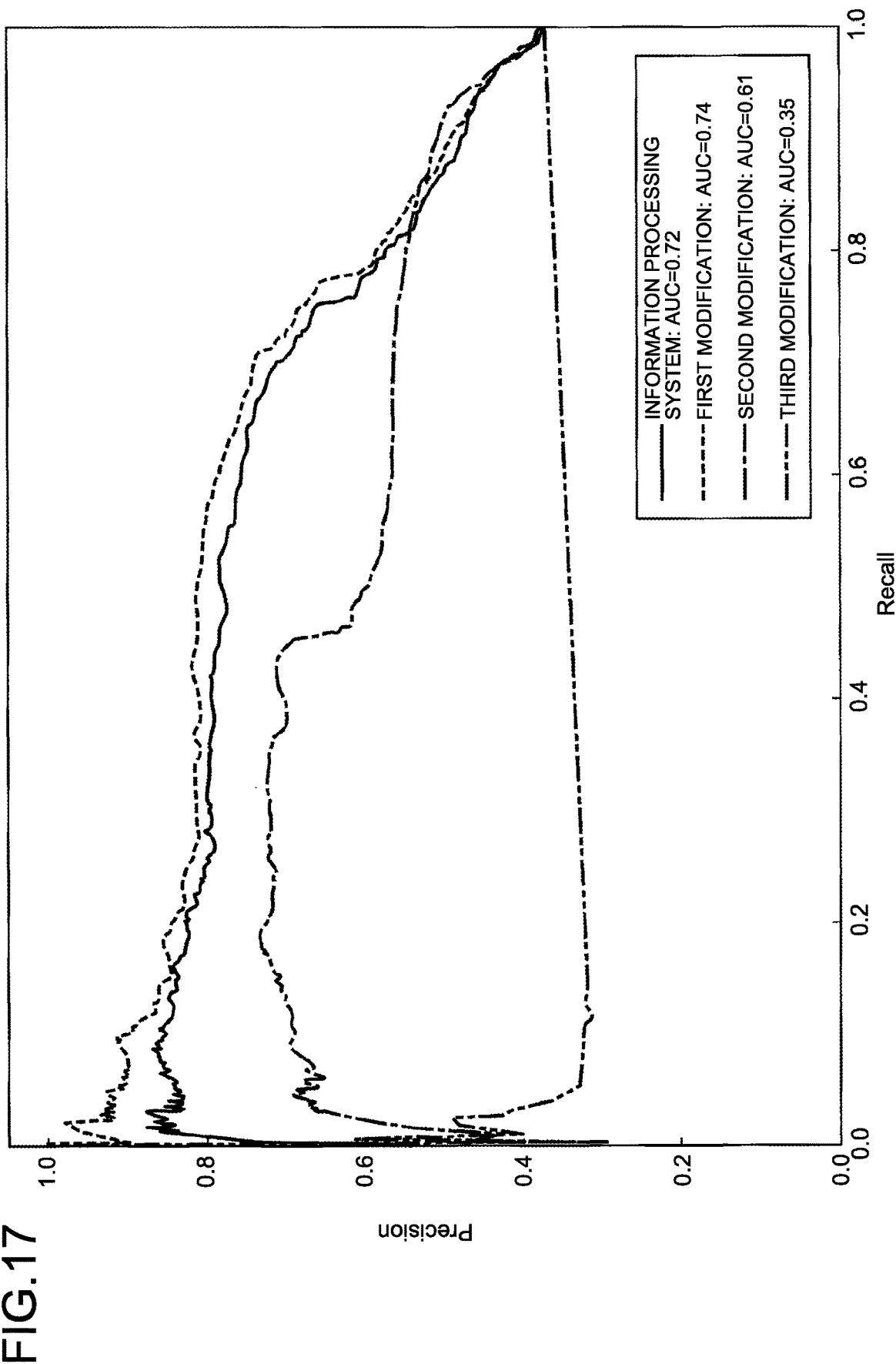
FIG. 17 is a diagram illustrating an example of processing results of the information processing system 1, the first modification, the second modification, and the third modification.

FIG. 17 is a diagram illustrating an example of processing results of the information processing system 1, the first modification, the second modification, and the third modification. The same explanation as FIG. 13 is omitted.

As illustrated in FIG. 17, the performances of the information processing system 1, the first modification, and the second modifications are higher than that of the third modification not including the conversation classifier 66. The performances of the information processing system 1 and the first modification are higher than that of the second modification not including the utterance classifier 24. In other words, the experiment has demonstrated that the conversation classifier 66 contributes significantly to the performance of the information processing system 1 of the present embodiment. It is to be noted that the performance of the first modification is little higher than that of the information processing system 1.

With the embodiment described above, the information processing system 1 can automatically acquire a clue for determining whether an unknown conversation is in a predetermined category, by including the extraction unit 62 that extracts the last conversation of the feedback utterance estimated to indicate a predetermined reaction of the second utterance subject relative to the utterance made by the first utterance subject, from a set of conversations, on the basis of the utterance score assigned to the feedback utterance; and the conversation classifier generation unit 64 that generates the conversation classifier 66 for deriving an index indicating the category of the unknown conversation, on the basis of the last conversation extracted by the extraction unit 62.

In one aspect of the present invention, it is possible to automatically acquire a clue for determining whether an unknown conversation is in a predetermined category.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing, device comprising:
a processor programmed to:
   extract a last conversation of a feedback utterance estimated to indicate a predetermined reaction of a second utterance subject relative to an utterance made by a first utterance subject, from a set of a plurality of conversations, based on a score that is assigned to the feedback utterance and that indicates a degree of probability that the last conversation is a predetermined category; and
   generate a subsequent stage classifier that derives an index indicating a category of an unknown conversation, the subsequent stage classifier being based on the extracted last conversation.

2. The information processing device according to claim 1, wherein the processor is programmed to generate the subsequent stage classifier that derives the index indicating the category of the unknown conversation, based on a label applied to the last conversation.

3. The information processing device according to claim 2, wherein the processor is programmed to generate the subsequent stage classifier by performing machine learning using information on the extracted last conversation and the label applied to the last conversation as learning data.

4. The information processing device according to claim 1, wherein:
the subsequent stage classifier derives an index indicating a category of an unknown conversation.

5. The information processing device according to claim 1, wherein the processor is programmed to generate a prior stage classifier that assigns a score to the feedback utterance.

6. The information processing device according to claim 1, wherein the processor is programmed to extract a last conversation of a feedback utterance assigned with a score biased to a first category side or a second category side from the set of conversations.

7. An information processing, device comprising:
a processor is programmed to:
   acquire a feedback utterance estimated to indicate a predetermined reaction of a second utterance subject relative to an utterance made by a first utterance subject; and
   generate a prior stage classifier that derives an index indicating a degree of a probability of a conversation of a predetermined category being made immediately before the acquired feedback utterance.

8. The information processing device according to claim 7, further comprising the prior stage classifier generated by the processor.

9. The information processing device according to claim 8, wherein the processor is programmed to:
acquire the feedback utterance, a last conversation of the feedback utterance applied with a first category, and a last conversation of the feedback utterance applied with a second category, and
generate the prior stage classifier based on acquired information.

10. The information processing device according to claim 9, wherein the processor is programmed to generate the prior stage classifier by performing machine learning using the acquired feedback utterance and a label indicating a category applied to the last conversation as learning data.

11. An information processing method causing a computer to execute:
extracting a last conversation of a feedback utterance estimated to indicate a predetermined reaction of a second utterance subject relative to an utterance made by a first utterance subject, from a set of a plurality of conversations, based on a score that is assigned to the feedback utterance and that indicates a degree of probability that the last conversation is a predetermined category; and
generating a subsequent stage classifier that derives an index indicating a category of an unknown conversation, the subsequent stage classifier being based on the extracted last conversation.

12. A non-transitory computer readable storage medium having stored therein a computer program that causes a computer to execute:
extracting a last conversation of a feedback utterance estimated to indicate a predetermined reaction of a second utterance subject relative to an utterance made by a first utterance subject, from a set of a plurality of conversations, based on a score that is assigned to the feedback utterance and that indicates a degree of probability that the last conversation is a predetermined category; and
generating a subsequent stage classifier that derives an index indicating a category of an unknown conversation, the subsequent stage classifier being based on the extracted last conversation.

13. An information processing method causing a computer to execute:
acquiring a feedback utterance estimated to indicate a predetermined reaction of a second utterance subject relative to an utterance made by a first utterance subject; and
generating a prior stage classifier that derives an index indicating a degree of a probability of a conversation of a predetermined category being made immediately before the acquired feedback utterance.

14. A non-transitory computer readable storage medium having stored therein a computer program that causes a computer to execute:
acquiring a feedback utterance estimated to indicate a predetermined reaction of a second utterance subject relative to an utterance made by a first utterance subject; and
generating a prior stage classifier that derives an index indicating a degree of a probability of a conversation of a predetermined category being made immediately before the acquired feedback utterance.

* * * * *